United States Patent
Samain

(10) Patent No.: US 10,427,568 B2
(45) Date of Patent: Oct. 1, 2019

(54) ACTUATOR ASSEMBLY AND METHOD FOR SEAT ADJUSTMENT

(71) Applicant: Schukra Gerätebau GmbH, Berndorf (AT)

(72) Inventor: Maxime Samain, Nürnberg (DE)

(73) Assignee: SCHUKRA GERAETEBAU GMBH, Berndorf (AT)

( * ) Notice: Subject to any disclaimer, the term of this patent is extended or adjusted under 35 U.S.C. 154(b) by 287 days.

(21) Appl. No.: 15/120,032

(22) PCT Filed: Nov. 11, 2014

(86) PCT No.: PCT/EP2014/074245
§ 371 (c)(1),
(2) Date: Aug. 18, 2016

(87) PCT Pub. No.: WO2015/128012
PCT Pub. Date: Sep. 3, 2015

(65) Prior Publication Data
US 2017/0050548 A1  Feb. 23, 2017

(30) Foreign Application Priority Data
Feb. 25, 2014  (EP) .................. 14156540

(51) Int. Cl.
*B60N 2/66* (2006.01)
*B60N 2/02* (2006.01)
(Continued)

(52) U.S. Cl.
CPC ......... *B60N 2/6671* (2015.04); *B60N 2/0232* (2013.01); *B60N 2/66* (2013.01);
(Continued)

(58) Field of Classification Search
CPC .............. B60N 2/6671; B60N 2/66; B60N 2002/0236; B60N 2/0232; B60N 2/7094;
(Continued)

(56) References Cited

U.S. PATENT DOCUMENTS 5,769,490 A   6/1998  Falzon
6,692,074 B1  2/2004  Kopetzky et al.
(Continued)

FOREIGN PATENT DOCUMENTS

CN  1575142 A       2/2005
EP  1611819 A1 *   1/2006  ............. A47C 7/462
(Continued)

OTHER PUBLICATIONS

International Search Report and Written Opinion, received in International Patent Application No. PCT/EP2014/074245, dated Jan. 27, 2015 (10 pages).

*Primary Examiner* — Milton Nelson, Jr.
(74) *Attorney, Agent, or Firm* — Michael Best & Friedrich LLP

(57) ABSTRACT

An actuator assembly for adjusting at least one component of a seat comprises a first traction device, a second traction device, and an actuator which comprises a spindle drive. The spindle drive comprises a first member which is rotatably mounted and a second member which is threadingly engaged with the first member and secured against rotation. Both the first traction device and the second traction device are coupled to the second member of the spindle drive.

12 Claims, 9 Drawing Sheets

(51) Int. Cl.
*B60N 2/90* (2018.01)
*B60N 2/70* (2006.01)

(52) U.S. Cl.
CPC ......... *B60N 2/6673* (2015.04); *B60N 2/7094* (2013.01); *B60N 2/99* (2018.02); *B60N 2002/0236* (2013.01)

(58) Field of Classification Search
CPC ........ B60N 2/6673; B60N 2/99; A47C 7/465; A47C 7/462
USPC ...................................................... 297/284.4
See application file for complete search history.

(56) References Cited

U.S. PATENT DOCUMENTS

| | | |
|---|---|---|
| 8,602,449 B2 | 12/2013 | Kojima |
| 2003/0071501 A1* | 4/2003 | Cruz Fernandes de Pinho ........... B60N 2/6671 297/284.4 |
| 2003/0094841 A1 | 5/2003 | McMillen et al. |
| 2003/0173806 A1 | 9/2003 | McMillen |
| 2004/0104609 A1 | 6/2004 | Blendea |
| 2008/0257099 A1* | 10/2008 | Prat Terrades ............ F16C 1/22 74/502.6 |

FOREIGN PATENT DOCUMENTS

| | | |
|---|---|---|
| KR | 20110029889 A | 3/2011 |
| WO | 2004/080243 A1 | 9/2004 |

\* cited by examiner

ACTUATOR ASSEMBLY AND METHOD FOR SEAT ADJUSTMENT

TECHNICAL FIELD

Embodiments of the invention relate to actuator assemblies and methods of adjusting at least one adjustable component of a seat. Embodiments of the invention relate in particular to actuator assemblies which comprise a traction device configured to apply a tension onto the at least one adjustable component.

BACKGROUND

Seats may be relatively complex structures including a combination of sub-systems. For illustration, vehicle seats may include a combination of sub-systems that may be used to position the seat, to provide heating and cooling, to provide an adjustable lumbar support, to adjust a seat contour, and/or to provide adjustable side support in addition to providing a comfortable seating area for occupants. Vehicle seats must provide a safe and comfortable seating area. Comfortable seating is increasingly important for drivers or passengers who spend extended time periods in a motor vehicle.

Various adjustable seat components are known which add to comfort. For illustration, an adjustable lumbar support structure may be integrated into the backrest of a vehicle seat. The adjustable lumbar support structure may be configured such that an amount of curvature and/or an apical position may be adjusted. In addition, massage functions may be provided in which different zones of the lumbar structure are displaced in a cyclical manner to produce a massage effect. Such lumbar support structures frequently include a flexible member which may be formed of a wire framework and/or a plastic member, suspended on a frame of the backrest. Alternatively or additionally, side bolsters of the seat may be adjustable. Adjustable side bolsters may provide a degree of lateral support which is set in accordance with the driver's needs and/or which may be dynamically adjusted, e.g. depending on lateral forces acting upon the driver when driving through a non-straight street. Alternatively or additionally, a contour of the seat backrest may be adjusted, e.g. by changing a curvature at certain sections of the backrest.

Various actuator assemblies may be used for adjusting seat components. Actuator assemblies which utilize traction devices, such as Bowden cables or wires configured to apply a tractive force, provide a high degree of flexibility in positioning the actuator. This is attractive with a view to packaging.

In order to adjust a tension applied by one or several Bowden cables or other traction devices, an actuator which comprises a pulley may be used, for example. The torques which must be exerted onto the pulley as the traction devices become tensioned may impose severe demands onto the output torque and power of a motor and/or the configuration of the speed reduction gearing coupled between the motor and the pulley of the actuator.

SUMMARY

There is a need in the art for actuators and assemblies for actuating traction devices which address at least some of the above demands. There is in particular a need for actuators and assemblies for actuating traction devices which allow several traction devices to be actuated simultaneously using an actuator which can be provided with a small and simple configuration.

According to embodiments, an actuator is provided for actuating traction devices which are respectively configured to apply a tractive force. The actuator includes a spindle drive. The spindle drive may include a first member which is rotatable and a second member which is threadingly engaged with the first member and which is displaceable in a translatory manner by rotation of the first member. The two or more traction devices are respectively coupled to the second member of the spindle drive which is displaced by rotation of the first member of the spindle drive.

By using an actuator which includes a spindle drive, the actuator may be provided with a compact and simple configuration. A motor having a comparatively low output power may be used to rotate the first member of the spindle drive and to thereby displace the second member of the spindle drive, which offers advantages in terms of weight and size.

An actuator assembly for adjusting at least one component of a seat comprises a first traction device, a second traction device, and an actuator. The actuator comprises a spindle drive. The spindle drive comprises a first member which is rotatably mounted.

The spindle drive comprises a second member which is threadingly engaged with the first member and secured against rotation. Both the first traction device and the second traction device are coupled to the second member of the drive mechanism.

The first traction device may comprise a sheath and an inner member slidably arranged in the sheath. The sheath may be attached to the second member of the spindle drive. Such a configuration allows the forces applied by the first and second traction devices to be simultaneously increased or decreased, even when the first traction device and the second traction device extend from the actuator along opposite directions.

The tension applied by the first traction device may be increased by the actuator pushing out the sheath of the first traction device. Increasing the tension by pushing out the sheath may also increase the comfort for a seat occupant because compared to increasing the tension by drawing in the inner member. By pushing out the sheath to increase the tension applied by the first traction device, the sheath and the inner member received therein may be displaced away from a surface of the seat on which the occupant rests, thereby reducing the loads experienced at the surface of the seat against which the seat occupant rests.

The first traction device may be a first Bowden cable.

The actuator assembly may comprise a housing in which the spindle drive is housed. The inner member of the first traction device may be attached to the housing. This configuration allows a tractive force applied by the first traction device to be adjusted by displacing an end of the sheath relative to an end of the inner member, which is stationary relative to the housing.

The second member of the spindle drive may have a receptacle for receiving an end of the sheath in abutting engagement. This allows the traction applied by the second traction device to be adjusted by displacing the end of the sheath.

The second traction device may comprise a wire or cable attached to the second member of the spindle drive. Such a configuration allows the forces applied by the first and second traction devices to be simultaneously increased or decreased when the first traction device and the second traction device extend from the actuator along opposite directions.

The housing may have a first side and a second side arranged opposite to the first side. The first side may define a first passage through which the first traction device extends. The second side may define a second passage through which at least a wire or cable of the second traction device extends. This allows the first and second traction devices to extend in substantially opposite directions from the actuator.

The housing may define a linear guide recess in which the second member of the spindle drive is slidably supported. The guide recess may engage the second member of the spindle drive to block it against rotation.

The second member of the spindle drive may be displaceable along a rotation axis of the first member of the spindle drive in a translatory manner.

The actuator may comprise a bias mechanism which exerts a bias force onto the second member of the spindle drive. The bias mechanism may be configured to exert a bias force onto the second member of the spindle drive which has a force component along a rotation axis of the first member. A magnitude of the force component may be a function of the position at which the second member of the spindle drive is positioned along the rotation axis of the first member. The bias mechanism may be configured such that the force applied by the bias mechanism onto the second member parallel to the rotation axis of the first member at least partially compensates the variation in force applied onto the second member of the spindle drive by the first traction device and the second traction device.

A portion of the first traction device which is located within the housing and a portion of the second traction device which is located within the housing may extend parallel to each other. This facilitates installation of the actuator in an assembly in which the first and second traction devices extend in opposite direction from the housing. Bends in the first and second traction devices may be kept small.

The first member of the spindle drive may be a spindle of the spindle drive. The second member of the spindle drive may be a spindle nut of the spindle drive. The spindle may have an external thread. The spindle nut may have an internal thread which is threadingly engaged with the external thread of the spindle. The spindle nut may be secured against rotation and may be displaceable in a translatory manner along a longitudinal axis of the spindle about which the spindle is rotatable. Such a configuration may be formed with a particularly compact installation space for the actuator, because the spindle nut is displaced on and along the spindle upon rotation of the spindle.

The first member of the spindle drive may be a spindle nut of the spindle drive. The second member of the spindle drive may be a spindle of the spindle drive. The spindle may have an external thread. The spindle nut may have an internal thread which is threadingly engaged with the external thread of the spindle.

The actuator assembly may be an actuator assembly for adjusting a lumbar support of a seat, e.g. of a vehicle seat.

The actuator assembly may be an actuator assembly for adjusting a side support of a seat, e.g. of a vehicle seat.

The actuator assembly may be an actuator assembly for adjusting a seat contour of a seat, e.g. of a vehicle seat.

According to another embodiment, there is provided a seat comprising the actuator assembly according to any embodiment.

The seat may comprise a first adjustable portion and a second adjustable portion. The first traction device may be coupled to the first adjustable portion. The second traction device may be coupled to the second adjustable portion.

The first adjustable portion and the second adjustable portion may be portions of a lumbar support member. The first adjustable portion and the second adjustable portion may be opposite side portions of the lumbar support member. The lumbar support member may be configured as a wire framework. The lumbar support member may be a support basket. The actuator assembly may be used for adjusting the lumbar support.

The first adjustable portion and the second adjustable portion may be side bolsters of the seat. The actuator assembly may be used for adjusting a side support.

The first adjustable portion and the second adjustable portion may define a seat contour of the seat. The actuator assembly may be used for adjusting the seat contour by adjusting the first and/or second adjustable portions.

The seat may be a vehicle seat.

In a method of adjusting at least one component of a seat according to an embodiment, an actuator assembly which comprises a first traction device, a second traction device, and an actuator is used. The actuator comprises a spindle drive which comprises a first member which is rotatably mounted and a second member which is threadingly engaged with the first member and secured against rotation. Both the first traction device and the second traction device are coupled to the second member of the drive mechanism. The method comprises actuating a motor to rotationally drive the first member of the spindle drive to cause a translatory displacement of the second member of the spindle drive.

The method may further comprise actuating the first traction device and the second traction device by the translatory displacement of the second member of the spindle drive.

The method may further comprise displacing the at least one component of the seat by the first traction device and the second traction device.

The method may be performed using the actuator assembly of any one embodiment.

The seat may be a vehicle seat.

The at least one adjustable component which is adjusted using the method may comprise a lumbar support.

The at least one adjustable component which is adjusted using the method may comprise a side support.

The at least one adjustable component which is adjusted using the method may comprise a seat contour.

Further features of the method and effects respectively attained thereby correspond to features of the actuator assembly and seat according to embodiments.

The devices and methods according to various embodiments may be utilized for adjusting at least one component of a seat. The devices and methods according to the various embodiments may in particular be utilized for adjusting one or several components of a vehicle seat, in particular an automotive vehicle seat.

BRIEF DESCRIPTION OF DRAWINGS

Additional features and advantages of the invention will become more readily appreciated from the following detailed description of preferred or advantageous embodiments with reference to the accompanying drawings in which like or identical reference numerals designate like or identical components.

DETAILED DESCRIPTION OF EMBODIMENTS

Figure 1:
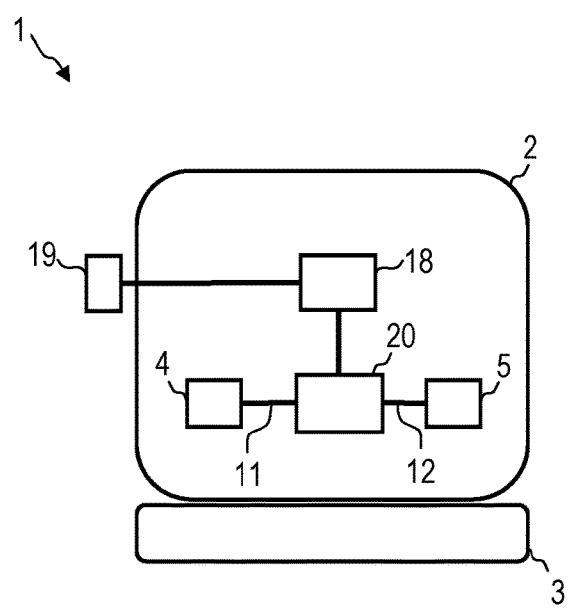
FIG. 1 is a schematic view of a seat according to an embodiment.

Exemplary embodiments of the invention will now be described with reference to the drawings. While some embodiments will be described in the context of specific fields of application, such as in the context of automotive vehicle seating, the embodiments are not limited to this field of application. The features of the various embodiments may be combined with each other unless specifically noted otherwise.

In the drawings, like reference numerals refer to like elements.

FIG. 1 is a schematic view of a seat 1 according to an embodiment. The seat 1 may be configured as a vehicle seat. The seat 1 may be configured as an automotive vehicle seat. The seat 1 may be configured as a car seat.

The seat 1 generally comprises a seat member 2 and a backrest 3. The seat 1 has at least one adjustable portion 4, 5 which may be provided on the seat member 2 and/or the backrest 3. For illustration, one, two or more than two adjustable portions 4, 5 may be provided on the backrest 3 to adjust a lumbar support. One, two or more than two adjustable portions 4, 5 may be provided on the seat member 2 or on the backrest 3 to provide an adjustable side support. One, two or more than two adjustable portions 4, 5 may be provided on the seat member 2 or on the backrest 3 to provide an adjustable contour of the surface which supports an occupant.

The seat 1 includes an actuator assembly for actuating one or several of the adjustable portions. The actuator assembly generally comprises an actuator 20, a first traction device 11 and a second traction device 12. The first traction device 11 and the second traction device 12 may respectively be configured to apply a tension. At least one of the first traction device 11 and the second traction device 12 may be configured as a Bowden cable which includes an inner member guided in a sheath. At least one of the first traction device 11 and the second traction device 12 may be configured as a wire or cable which is not guided in a resilient sheath. Both the first traction device 11 and the second traction device 12 may be coupled to the actuator 20. The first traction device 11 may be coupled to the first adjustable portion 4 to displace the first adjustable portion 4 relative to a frame of the backrest 3, for example, when the tension applied by the first traction device 11 is varied by the actuator 20. The second traction device 12 may be coupled to the second adjustable portion 5 to displace the second adjustable portion 5 relative to a frame of the backrest 3, for example, when the tension applied by the second traction device 12 is varied by the actuator 20.

As will be explained in more detail with reference to FIG. 2 to FIG. 18 below, the actuator 20 comprises a spindle drive. The spindle drive comprises a first member which is rotatably mounted. The spindle drive comprises a second member which is threadingly engaged with the first member. The second member may be mounted so as to be secured against rotation. The second member may be mounted such that it is displaceable in a translatory manner. Both the first traction device 11 and the second traction device 12 are coupled to the second member of the spindle drive of the actuator 20. For illustration, a sheath of the first traction device 11 and a wire or cable of the second traction device 12 may be attached to, or otherwise supported on, the second member of the spindle drive.

When the first member of the spindle drive is rotationally driven, the second member of the spindle drive is displaced along a rotation axis of the first member. The second member acts both onto the first traction device 11 and onto the second traction device 12, causing the tension applied by the first traction device 11 and the tension applied by the second traction device 12 to be simultaneously adjusted.

The first traction device 11 and the second traction device 12 may respectively be configured such that they can only apply a tension, i.e., a tractive force, but cannot apply a compressive force onto the adjustable portions 4, 5 to which they are attached.

The first member of the spindle drive may be rotated by a motor or other power drive of the actuator 20. The power drive of the actuator 20 may be activated under the control of a control unit 18. The control unit 18 may comprise one or several microprocessors, one or several microcontrollers, one or several processors, one or several controllers, one or several application specific integrated circuits (ASICs) and/or a combination of such devices. The control unit 18 may control rotation of the motor as a function of an input received from an input device 19 or a board network of a vehicle, for example.

Figure 2:
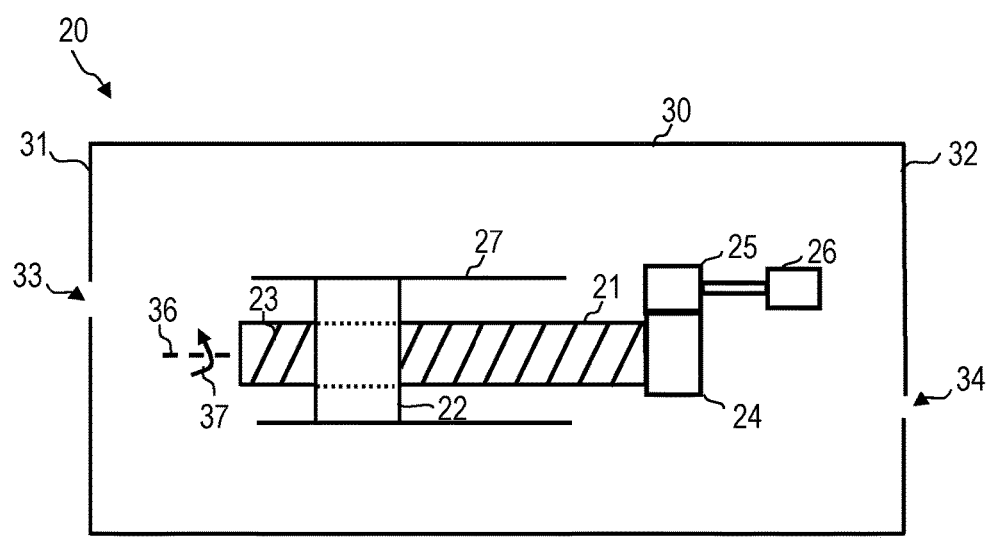
FIG. 2 is a schematic plan view of an actuator of an actuator assembly according to an embodiment.

Referring now to FIG. 2, an actuator 20 according to an embodiment will be explained in more detail. The actuator 20 may be coupled to both the first traction device 11 and the second traction device 12.

The actuator 20 includes a spindle drive. The spindle drive includes a first member 21 which is rotatably mounted. The spindle drive includes a second member 22 which is threadingly engaged with the first member 21 and which is mounted so as to be displaceable along a longitudinal axis of the first member 21. The first member 21 may be a spindle of the spindle drive. The second member 22 may be a spindle nut which is secured against rotation. The first member 21 may have an external thread 23 which is threadingly engaged with an internal thread of the second member 22, which is best seen as internal thread 28 in FIG. 6. A pitch of the internal thread 28 of the second member 22 may be identical to a pitch of the external thread 23 of the first member 21.

While the first member 21 is implemented as a spindle and the second member 22 is implemented as a spindle nut in the actuator 20 of FIG. 2, other configurations may be used in other embodiments. For illustration, the first member may be implemented as a spindle nut which is rotated in operation, and the second member may be implemented as a spindle which is secured against rotation, as will be explained in more detail with reference to FIG. 12.

The first member 21 and the second member 22 may be mounted in a housing 30 of the actuator. The housing 30 may define a support for the first member 21 which allows the first member 21 to rotate. The housing 30 may be configured to block the second member 22 against rotation. For illustration, a guide recess 27 may be integrated into the housing 20 in which the second member 22 is received so as to be linearly displaceable along the guide recess 27. The guide recess 27 may be a linear guide recess. A longitudinal axis of the guide recess 27 may extend parallel to a rotation axis of the first member 21.

A drive mechanism configured to rotationally drive the first member 21 may be provided in the housing 30. The drive mechanism may include a power drive 26, which may be configured as a motor. The drive mechanism may include a gearing. The gearing may have one or several speed reduction stages. The gearing may comprise a one-stage worm transmission or a two stage worm transmission or another speed reduction gearing. For illustration, a worm wheel 24 may be provided on the first member 21 in a torque-proof manner. The worm wheel 24 may be formed integrally with the first member 21. The worm wheel 24 may be overmolded onto the first member 21 or may be affixed to the first member 21 in a torque-proof manner in a different way. A worm 25 may be engaged with the worm wheel 24. The worm 25 may be coupled to an output shaft of the power drive 26.

In operation of the actuator, actuation of the power drive 26 causes the first member 21 to be rotationally driven. The first member 21 performs a rotation 37 about a rotation axis 36. This causes the second member 22 to be linearly displaced along the guide recess 27.

As will be explained in more detail with reference to FIG. 3 to FIG. 4, both the first traction device 11 and the second traction device 12 may be coupled to the second member 22 of the spindle drive, i.e., to the member which is displaceable in a translatory manner. At least one of the first traction device 11 and the second traction device 12 may include an outer sheath and an inner member displaceable within the outer sheath. For illustration, the first traction device 11 may have an outer sheath which abuts on the second member 22, while the inner member of the first traction device 11 is affixed so as to be stationary relative to the housing 30. The second traction device 12 may comprise a wire or cable, which may optionally also be received in another sheath.

The wire or cable of the second traction device 12 may be attached to the second member 22 of the spindle drive.

In order to allow the first traction device 11 and the second traction device 12 to be coupled to the second member 22 of the spindle drive, the housing 30 may have a first side 31 which defines a first passage 33 through which the first traction device 11 may extend into the housing 30. The housing 30 may have a second side 32 which defines a second passage 34 through which the cable or wire of the second traction device 12 may extend into the housing 30. The first side 31 and the second side 32 may be opposite sides of the housing 30. This allows the first traction device 11 and the second traction device 12 to extend from the housing 30 in essentially opposite directions, without introducing significant bends into the first traction device 11 or the second traction device 12.

Figure 3:
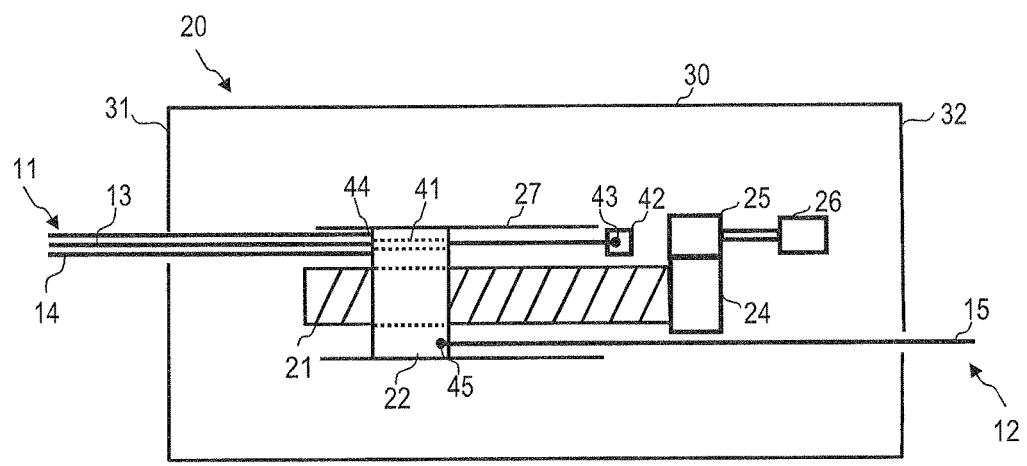
FIG. 3 is a schematic plan view of the actuator assembly comprising the actuator of FIG. 2 in a first operation state.
Figure 4:
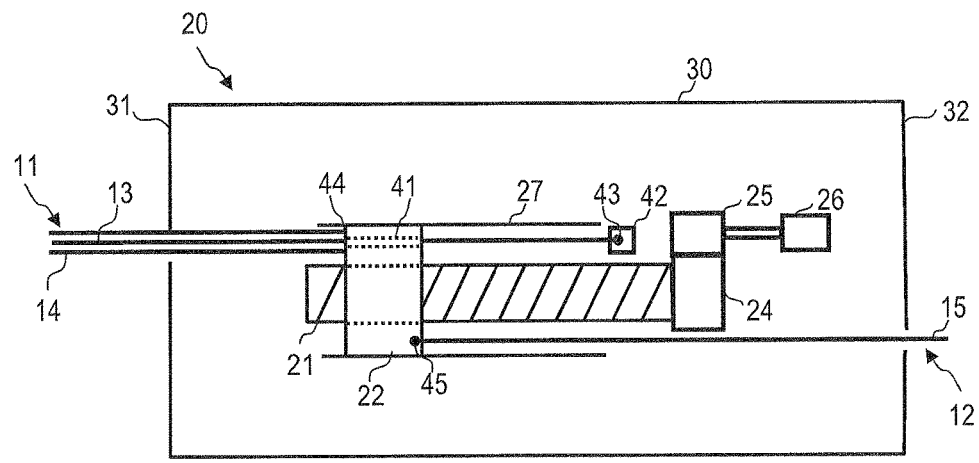
FIG. 4 is a schematic plan view of the actuator assembly comprising the actuator of FIG. 2 in a second operation state.

FIG. 3 and FIG. 4 show an actuator assembly comprising the actuator 20 of FIG. 2 in different operation states. The actuator assembly comprises the actuator 20, the first traction device 11 and the second traction device 12.

The first traction device 11 has a sheath 14 and an inner member 13 which is slidable within the sheath 14. The first traction device 11 may be a Bowden cable. The sheath 14 may be formed from a resilient material. The inner member 13 may be a wire or cable.

The second traction device 12 may be configured as a wire 15 or as a cable 15. The second traction device 12 may optionally comprise another sheath in which the wire or cable 15 is slidable. The second traction device 12 may, but does not need to be configured as a second Bowden cable. The second traction device 12 does not need to comprise a sheath in which the wire or cable 15 is slidable.

The second member 22 may have a recess 41 which allows the inner member 13 of the first traction device 11 to extend through or along the second member 22. The recess 41 may be a through opening formed in the second member 22. The recess 41 may have a longitudinal axis which extends parallel to a rotation axis 36 of the first member 21. The recess 41 may have a longitudinal axis which extends parallel to a longitudinal axis of the guide recess 27.

An end 43 of the inner member 13 of the first traction device 11 may be attached so as to be stationary relative to the housing 30. The housing 30 may have a mount 42 which is configured to affix the end 43 of the inner member 13.

An end 44 of the sheath 14 of the first traction device 11 may abut on the second member 22. A resilient force of the sheath 14 may urge the end 44 of the sheath 14 into abutment with the second member 22 of the spindle drive. The second member 22 may have a receptacle in which at least a portion of the end 44 of the sheath 14 may be received.

The first traction device 11 may be coupled to the second member 22 of the spindle drive in such a manner that a displacement of the second member 22 causes the end 44 of the sheath 14 to be displaced relative to the housing 30, but does not cause the end 43 of the inner member 13 to be displaced relative to the housing 30. A displacement of the second member 22 of the spindle drive causes a displacement of the sheath 14 relative to the inner member 13 of the first traction device 11, thereby increasing or decreasing the tension respectively applied by the first traction device 11.

The wire or cable 15 of the second traction device 12 may be coupled to the second member 22. The wire or cable 15 of the second traction device 12 may have an end 45 which is attached to the second member 22. For illustration, the second member 22 may have a recess for receiving an enlarged diameter end portion 45, e.g. an end nipple, of the second traction device 12.

The second traction device 12 may be coupled to the second member 22 of the spindle drive in such a manner that a displacement of the second member 22 causes the wire or cable 15 of the second traction device 12 to be withdrawn into the housing 30 or to be played out from the housing 30, depending on the rotation direction of the first member 21. A displacement of the second member 22 of the spindle drive thereby causes a displacement of the wire or cable 15 of the second traction device 12, thereby increasing or decreasing the tension respectively applied by the second traction device 12.

In operation of the actuator 20, rotation of the first member 21 in a first direction of rotation causes the second member 22 to be displaced along the rotation axis 36 of the first member 21 in a first direction. For illustration, as illustrated in FIG. 3 and FIG. 4, rotation of the first member 21 in the first direction of rotation may cause the second member 22 to be displaced along the guide recess 27 in a direction away from the second side 32 and towards the first side 31 of the housing 30. This movement of the second member 22 causes the sheath 14 of the first traction device 11 to be pushed out from the housing 30 while maintaining the end 43 of the inner member 13 stationary relative to the housing 30. This movement of the second member 22 also causes the wire or cable 15 of the second traction device 12 to be drawn further into the housing 30. Thereby, both the tension applied by the first traction device 11 onto the first adjustable portion 4 and the tension applied by the second traction device 12 onto the second adjustable portion 5 are increased.

In operation of the actuator 20, rotation of the first member 21 in a second direction of rotation opposite to the first direction of rotation causes the second member 22 to be displaced along the rotation axis 36 of the first member 21 in a second direction which is opposite to the first direction. For illustration, rotation of the first member 21 in the second direction of rotation may cause the second member 22 to be displaced along the guide recess 27 in a direction away from the first side 31 and towards the second side 32 of the housing 30. This movement of the second member 22 causes the sheath 14 of the first traction device 11 to be pushed further into the housing 30 while maintaining the end 43 of the inner member 13 stationary relative to the housing 30. This movement of the second member 22 also causes the wire or cable 15 of the second traction device 12 to be played out from the housing 30. Thereby, both the traction applied by the first traction device 11 onto the first adjustable portion 4 and the traction applied by the second traction device 12 onto the second adjustable portion 5 are decreased.

As explained with reference to FIG. 3 and FIG. 4, the actuator 20 according to embodiments is configured to simultaneously increase the tension applied by the first traction device 11 and the tension applied by the second traction device 12 when the second member 22 is displaced along the rotation axis 36 of the first member 21 in the first direction. The actuator 20 is configured to simultaneously decrease the tension applied by the first traction device 11 and the tension applied by the second traction device 12 when the second member 22 is displaced along the rotation axis 36 of the first member 21 in a second direction opposite to the first direction.

A portion of the first traction device 11 and a portion of the second traction device 15 located within the housing 30 may extend substantially parallel to each other. The first traction device 11 and the second traction device 12 may extend from the housing 30 along substantially parallel directions. This facilitates installation of the actuator assembly without requiring significant bends to be introduced in the first traction device 11 and the second traction device 12.

Figure 5:
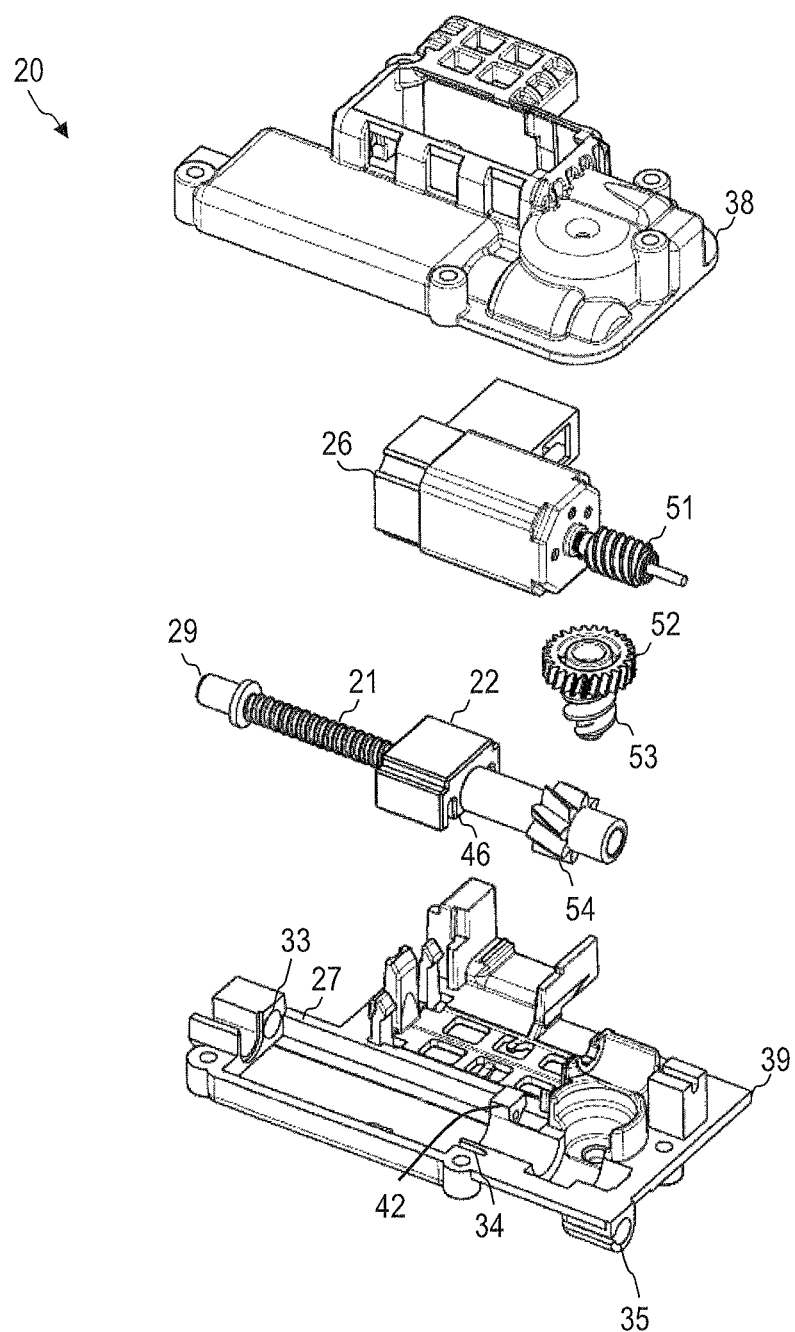
FIG. 5 is an exploded view of an actuator of an actuator assembly according to an embodiment.

FIG. 5 is an exploded view of the actuator 20 according to an embodiment. The housing 30 comprises a first shell 38 and a second shell 39. In combination, the first shell 38 and the second shell 39 are configured to house the first member 21 of the spindle drive. The first shell 38 and the second shell 39 may be configured to rotatably support the first member 21. An end portion 29 of the first member 21 may be rotatably supported on a mating recess of the first shell 38 and/or of the second shell 39. The first shell 38 and/or the second shell 39 may also define the guide recess 27 in which the second member 22 is slidably received. The end portion 29 of the first member 21 may also act as an end stop for limiting a displacement of the second member 22 along the rotation axis of the first member 21 of the spindle drive.

The second member 22 of the spindle drive may have a channel 46 for attaching the end 35 of the wire or cable 15 of the second traction device 12. The housing may define a receptacle 35 in which an end of a sheath of the second traction device 12 may be received, if the actuator is used in association with a second traction device 12 which is also a Bowden cable, for example. The receptacle 35 is configured to receive the end of the outer sheath of the Bowden cable of the second traction device 12 such that it remains stationary relative to the housing of the actuator. The receptacle 35 allows the wire or cable 15 of the second traction device 12 to pass into the housing for attachment to the second member 22.

A gearing may be coupled between the power drive and the first member 21 of the spindle drive. The gearing may comprise at least one worm transmission. The gearing may comprise a two-stage worm transmission. More transmission stages may be provided. The gearing may be implemented as a speed reduction gearing. The gearing may comprise a first worm 51 which is attached to an output shaft of the power drive 26 in a torque-proof manner. The first worm 51 may be rotatably supported in the housing defined by the first shell 38 and the second shell 39. The gearing may comprise a first worm wheel 52 engaged with the first worm 51. A second worm 53 may be provided so as to be rotationally fixed relative to the first worm wheel 52. The second worm 53 may be integrally formed with the first worm wheel 52. The second worm 53 may be attached to the first worm wheel 52 in a torque-proof manner. The first worm wheel 52 and the second worm 53 may be rotatably supported in the housing defined by the first shell 38 and the second shell 39. A second worm wheel 54 may be engaged with the second worm 53. The second worm wheel 54 may be rotationally fixed relative to the first member 21 of the spindle drive. The second worm wheel 54 may be attached to the first member 21 in a torque-proof manner or may be integrally formed with the first member 21. The second worm wheel 54 may be rotatably supported in the housing defined by the first shell 38 and the second shell 39.

Figure 6:
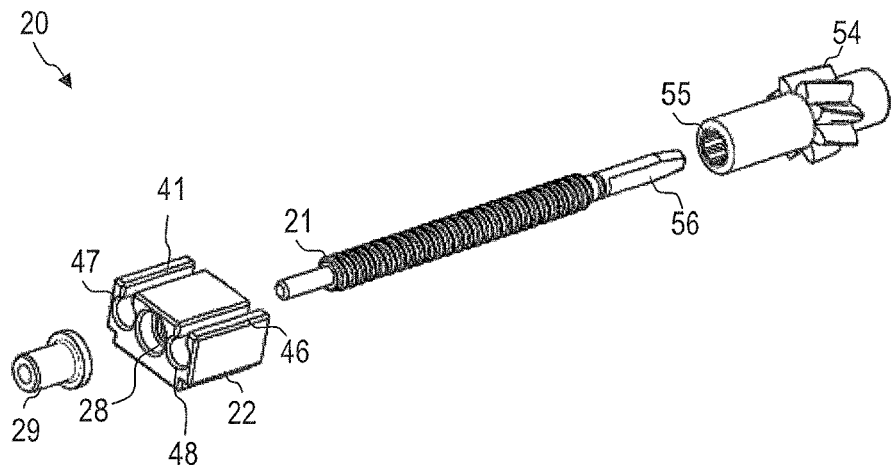
FIG. 6 is a partial exploded view of a spindle drive of the actuator of FIG. 5.

FIG. 6 shows an enlarged partial exploded view of the actuator 20. The second worm wheel 54 may be formed at an outer periphery of a sleeve. The sleeve may have a cavity with engagement features 55 which allow the sleeve to be attached to an end 56 of the first member 21. The end 56 of the first member 21 and the engagement features 55 of the sleeve may be configured to rotationally secure the sleeve with the second worm wheel 54 relative to the first member 21. The end 56 of the first member 21 and the engagement features 55 of the sleeve may be configured to allow the sleeve to be reversibly pushed onto the first member 21 along an axial direction of the first member 21.

The second member 22 of the spindle drive has an outer shape configured for engagement with the guide recess 27 of the housing. The outer shape of the second member together with the shape of the guide recess 27 prevents the second member 22 from rotating when the first member 21 is rotated.

The second member 22 has a channel 41 for allowing the inner member 13 of the first traction device to pass through the second member 22. The channel 41 may extend through the second member 22 in a direction parallel to the rotation axis of the first member 21.

The second member 22 has a receptacle 47 for receiving the sheath 14 of the first traction device 11 in abutting engagement. The receptacle 47 may have a dimension configured to receive the end 44 of the sheath 14. The receptacle 47 may define an inlet opening for the channel 41 through which the inner member 13 of the first traction device 11 is passed.

The second member 22 has a channel 46 for attaching the wire or cable 15 of the second traction device 12. The channel 46 may have an increased diameter portion 48. An increased diameter end 45 of the wire or cable 15 of the second traction device 12 may be received in the increased diameter portion 48 of the channel 46. The configuration of the channel 46 secures the end 45 of the wire or cable 15 at the second member 15. The channel 46 prevents passage of the increased diameter end 45 of the wire or cable 15 through the channel 46.

The actuator assembly comprising the actuator 20, the first traction device 11, and the second traction device 12 may be installed in a seat, e.g. a vehicle seat. The actuator assembly may be used to adjust a wide variety of different portions of the vehicle seat, as will be explained in more detail with reference to FIG. 7 to FIG. 10.

Figure 7:
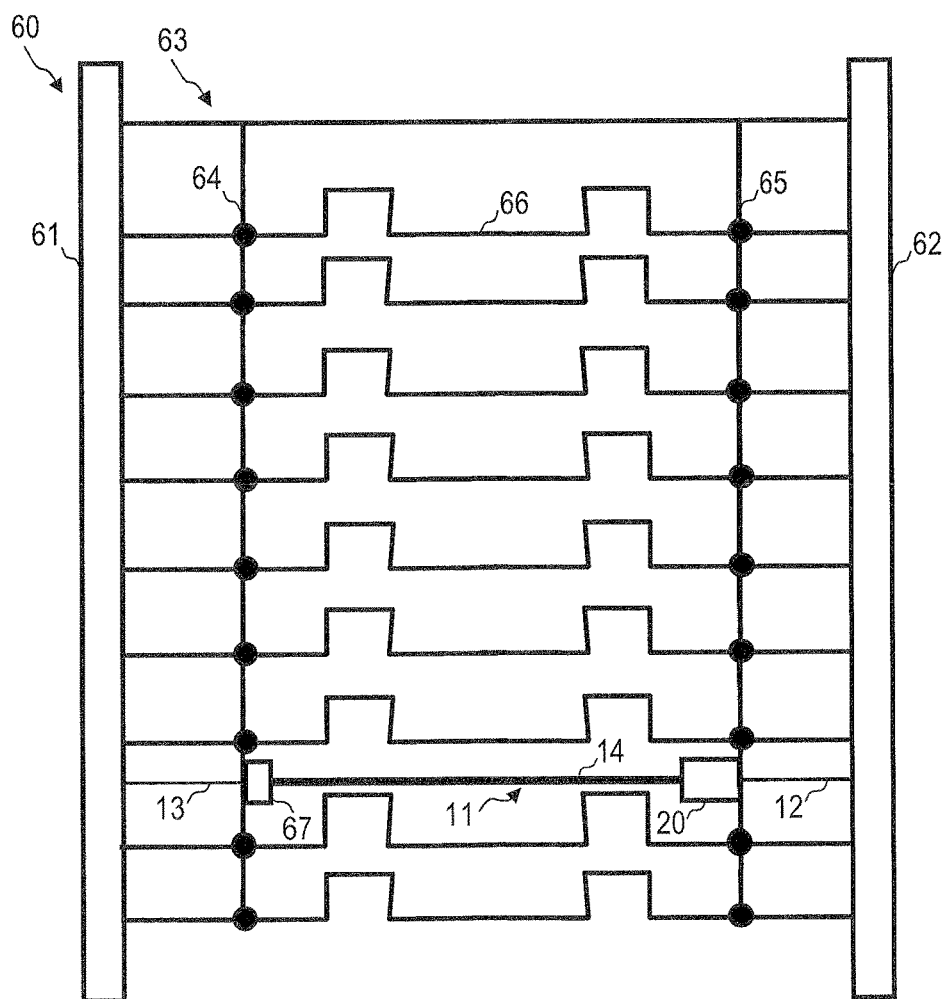
FIG. 7 shows an adjustable component of a vehicle seat in combination with an actuator assembly according to an embodiment.

FIG. 7 is a partial view of a seat 60 which includes an actuator assembly according to an embodiment. The actuator assembly is coupled to a lumbar support 63 to adjust at least a portion of the lumbar support 63. The actuator assembly may be configured to adjust a curvature of the lumbar support 63 or to displace a portion of the lumbar support 63 in the forward-rearward direction of the seat 60.

The lumbar support 63 may comprise a first side 64 and a second side 65. The lumbar support 63 may be a wire mat. The first side 64 may be a first side wire. The second side 65 may be a second side wire. A plurality of transverse wires 66 may be attached to the first side wire and the second side wire.

The lumbar support 63 may have a wide variety of other configurations. The lumbar support 63 may be a support basket. The lumbar support 63 may be a support basket molded from plastic material.

The lumbar support 63 may be attached to a first structural member 61 and a second structural member 62 of the seat. The first structural member 61 and the second structural member 62 may be sides of a backrest frame, for example.

The actuator 20 may be mounted to one of the sides of the lumbar support 63. The actuator 20 may be mounted to the second side 65 of the lumbar support 63, for example. The sheath 14 of the first traction device 11 may have one end attached to the second member 22 of the spindle drive of the actuator and an opposite end attached to the first side 64 of the lumbar support 63. A bracket 67 attached to the first side 64 may retain the opposite end of the sheath 14 of the first traction device 11.

The inner member 13 of the first traction device 14 may extend from the other end of the sheath 14 which is attached to the first side 64 towards the first structural member 61. An end of the inner member 13 which extends from the sheath 14 towards the first structural member 61 may be attached to the first structural member 61.

The second traction device 12 may extend from the actuator 20 towards the second structural member 62. The second traction device 12 may be attached to the second structural member 62. A wire or cable of the second traction device 12 may be attached to the second structural member 62.

When the actuator 20 is activated such that the first member 21 of the spindle drive is rotated in the first direction of rotation, the second member 22 is displaced in a translatory manner to both push out the sheath 14 from the actuator 20 and to draw the wire or cable 15 of the second traction device 12 further into the actuator 20. The resulting increase in tension of both the first traction device 11 and the second traction device 12 causes a forward force to be applied onto both the first side 64 at the location of the bracket 67 and onto the second side 65 at the location of the actuator 20. The curvature or degree of support provided by the lumbar support 63 may thereby be adjusted.

Increasing the tension applied by the first traction device 11 by pushing out the sheath 14 from the actuator 20 may also increase the comfort for a seat occupant. When the tension is increased, the sheath 14 is pushed out from the actuator 20 and may be displaced so as to increase a distance between the sheath 14 and the lumbar support 63 at least at a lateral center of the lumber support. I.e., the sheath 14 and the inner member 13 received therein may be pushed rearward at the lateral center of the lumbar support 63 when the tension is increased by pushing out the sheath 14. The loads experienced at the surface of the seat against which the seat occupant rests may be reduced thereby when the tension applied by the first traction device 11 is increased.

When the actuator 20 is activated such that the first member 21 of the spindle drive is rotated in the second direction of rotation, the second member 22 is displaced in a translatory manner such that the resilient force of the sheath 14 pushes the sheath 14 further into the actuator 20 and that the wire or cable 15 of the second traction device 12 is played out further from the actuator 20. The resulting decrease in tension of both the first traction device 11 and the second traction device 12 decreases the forward force applied onto both the first side 64 at the location of the bracket 67 and onto the second side 65 at the location of the actuator 20. The curvature or degree of support provided by the lumbar support 63 may thereby be adjusted so as to decrease the curvature of the lumbar support 63.

The actuator assembly may be used in a wide variety of different configurations for adjusting the lumbar support. For illustration, the actuator assembly may also be coupled to upper and lower ends of the lumbar support 63 to adjust a distance between the upper and lower ends of the lumbar support 63. The degree of curvature of the lumbar support 63 may thereby be adjusted.

Figure 8:
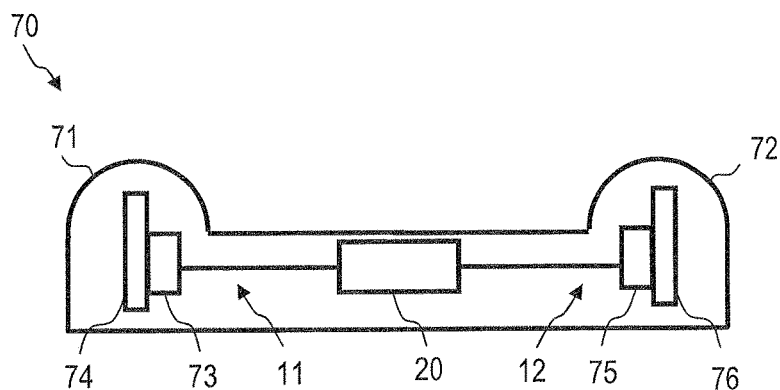
FIG. 8 is a cross-sectional view of a seat comprising adjustable side bolster portions and an actuator assembly according to an embodiment.
Figure 9:
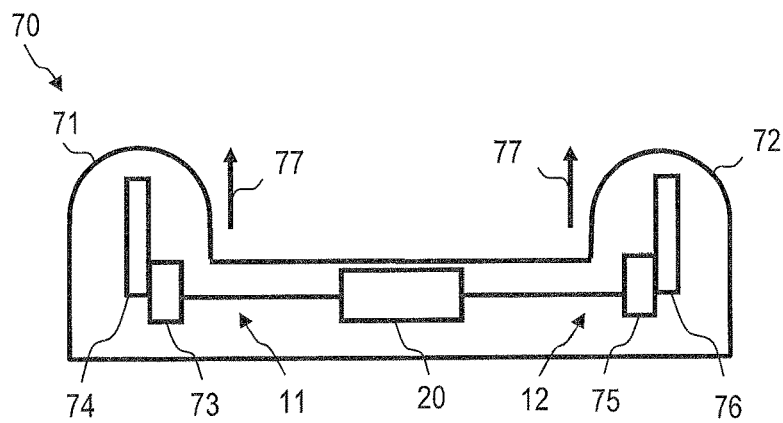
FIG. 9 is a cross-sectional view of the seat of FIG. 8 when the actuator of the actuator assembly is activated.

FIG. 8 and FIG. 9 is a partial view of a seat 70 which includes an actuator assembly according to an embodiment. The actuator assembly is coupled to an adjustable side bolster to adjust the side bolster.

The seat 70 includes a first side bolster 71 which may be a first side cheek of the seat 70. The seat 70 includes a second side bolster 72 which may be a second side cheek of the seat 70.

The actuator assembly is coupled to a first adjusting mechanism for adjusting the first side bolster 71. The first adjusting mechanism includes a support 73 and an adjusting member 74 displaceably supported on the support 73. The adjusting member 74 may be coupled to an inner member 13 of the first traction device 11. The sheath 14 of the first traction device 11 may be supported on the support 73. A change in the tension applied by the first traction device 11 causes a displacement of the adjusting member 74 relative to the support 73.

The actuator assembly is coupled to a second adjusting mechanism for adjusting the second side bolster 72. The second adjusting mechanism includes a further support 75 and a further adjusting member 76 displaceably supported on the further support 75. The second traction device 12 may be a second Bowden cable which includes a sheath and an inner cable or wire. The further adjusting member 74 may be coupled to the inner cable or wire of the second traction device 12. The sheath of the second traction device 12 may be supported on the second support 75. A change in the tension applied by the second traction device 12 causes a displacement of the second adjusting member 76 relative to the second support 75.

When the actuator 20 is activated such that the first member 21 of the spindle drive is rotated in the first direction of rotation, the second member 22 is displaced in a translatory manner to both push out the sheath 14 from the actuator 20 and to draw the wire or cable 15 of the second traction device 12 further into the actuator 20. The resulting increase in tension of both the first traction device 11 and the second traction device 12 may cause a displacement of the adjusting member 74 relative to the support 73 and a displacement of the second adjusting member 76 relative to the second support 75. The first side bolster 71 and the second side bolster 72 may undergo a forward movement 77.

When the actuator 20 is activated such that the first member 21 of the spindle drive is rotated in the second direction of rotation, the second member 22 is displaced in a translatory manner such that the resilient force of the sheath 14 pushes the sheath 14 further into the actuator 20 and that the wire or cable 15 of the second traction device 12 is played out further from the actuator 20. The resulting decrease in tension of both the first traction device 11 and the second traction device 12 may cause another displacement of the adjusting member 74 relative to the support 73 and another displacement of the second adjusting member 76 relative to the second support 75. The first side bolster 71 and the second side bolster 72 may undergo a rearward movement.

Figure 10:
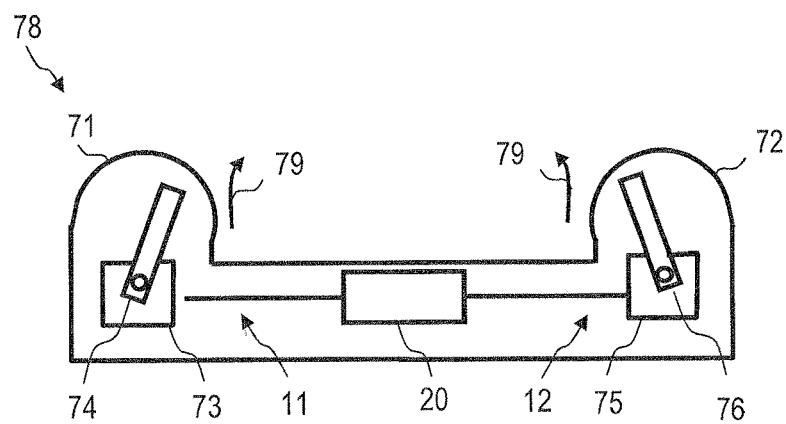
FIG. 10 is a cross-sectional view of a seat comprising an adjustable seat contour and an actuator assembly according to an embodiment.

FIG. 10 is a partial view of a seat 78 which includes an actuator assembly according to an embodiment. The actuator assembly is coupled to an adjustable side bolster to adjust a seat contour of the seat. The seat may comprise a first adjusting mechanism for adjusting the seat contour which includes a support 73 and an adjusting member 74 displaceably supported on the support 73. The adjusting member 74 may be supported on the support 73 such that it pivotable and/or slidable relative to the support 73. The adjusting member 74 may be coupled to an inner member 13 of the first traction device 11. The sheath 14 of the first traction device 11 may be supported on the support 73. A change in the tension applied by the first traction device 11 causes a pivoting movement and/or a sliding displacement of the adjusting member 74 relative to the support 73.

The seat may comprise a second adjusting mechanism for adjusting the seat contour which includes a second support 75 and a second adjusting member 76 displaceably supported on the second support 75. The second adjusting member 76 may be supported on the second support 75 such that it is pivotable and/or slidable relative to the second support 75. The second traction device 12 may be configured as a second Bowden cable. The second adjusting member 76 may be coupled to an inner wire or cable of the second traction device 12. A sheath of the second traction device 12 may be supported on the second support 75. A change in the tension applied by the second traction device 12 causes a pivoting movement and/or a sliding displacement of the second adjusting member 76 relative to the second support 75.

Actuation of the actuator 20 may cause a displacement 79 of at least one portion of the seat 78. For illustration, the side bolsters 71, 72 may undergo a forward and inward movement 79 when the first member 21 of the spindle drive is rotated in a first direction to thereby change the seat contour. The side bolsters 71, 72 may undergo a rearward and outward movement when the first member 21 of the spindle drive is rotated in a second direction to thereby change the seat contour.

Various modifications and alterations of the actuator assembly and seats may be implemented in other embodiments, as will be explained in more detail with reference to FIG. 11 to FIG. 15.

Figure 11:
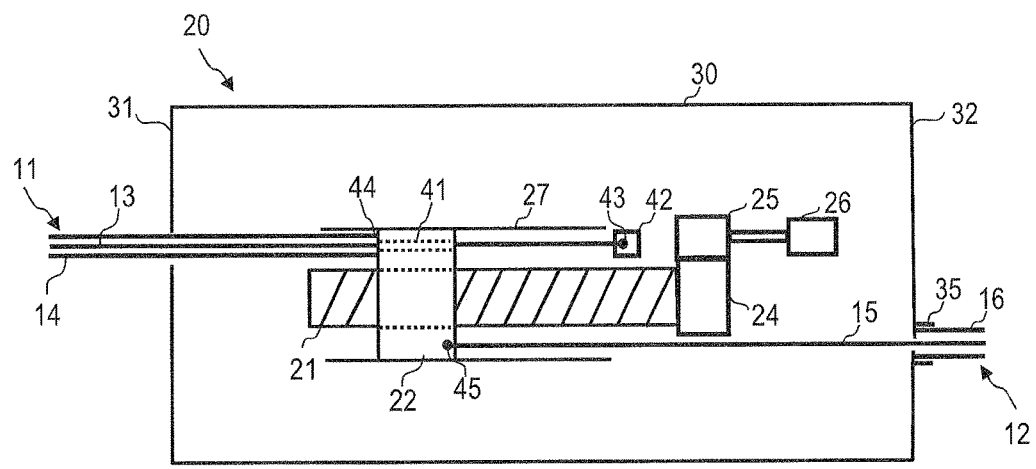
FIG. 11 is a schematic plan view of an actuator assembly according to another embodiment.

FIG. 11 shows an actuator assembly comprising the actuator 20 of FIG. 2. In the actuator assembly of FIG. 11, the second traction device 12 is a second Bowden cable. The second traction device 12 comprises the wire or cable 15 which is slidably guided in a second sheath 16. An end of the sheath 16 may be supported in a receptacle 35 on the housing 30 of the actuator.

In any one of the various embodiments, the spindle drive may have a configuration different from the one explained with reference to FIG. 2 to FIG. 4. In particular, the first member which is rotatably mounted may be implemented as a spindle nut. The second member which is displaceable in translatory manner may be implemented as a spindle, as will be explained in more detail with reference to FIG. 12.

Figure 12:
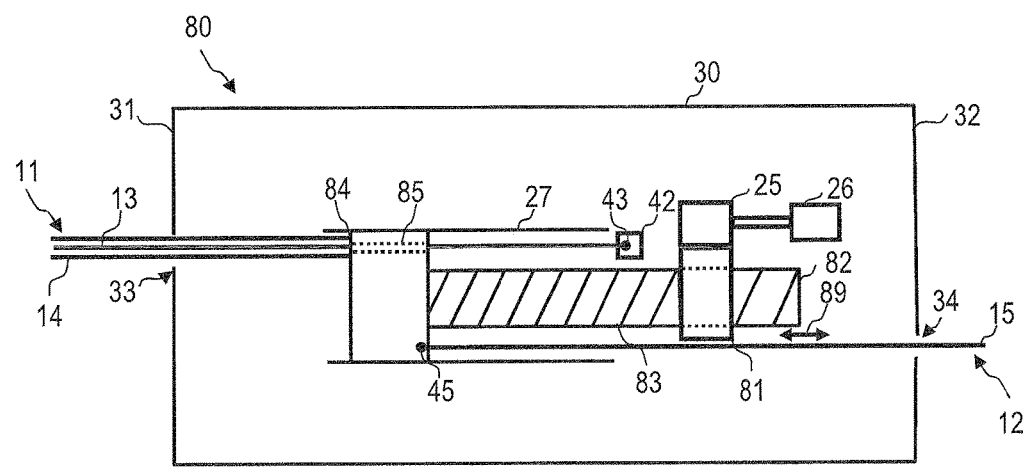
FIG. 12 is a schematic plan view of an actuator assembly according to another embodiment.

FIG. 12 shows an actuator assembly according to another embodiment. The actuator assembly comprises an actuator 80.

The actuator 80 includes a spindle drive. The spindle drive includes a first member 81 which is rotatably mounted. The spindle drive includes a second member 82 which is threadingly engaged with the first member 81 and which is mounted so as to be displaceable along a rotation axis of the first member 81. The first member 81 is a spindle nut of the spindle drive. The second member 82 is a spindle which is secured against rotation. The first member 81 may have an internal thread which is threadingly engaged with an external thread 83 of the second member 82. A pitch of the internal thread of the first member 71 may be identical to a pitch of the external thread 83 of the second member 82.

The first member 81 and the second member 82 may be mounted in a housing 30 of the actuator. The housing 30 may define a support for the first member 81 which allows the first member 81 to rotate. The housing 30 may be configured to block the second member 82 against rotation. For illustration, a guide recess 27 may be integrated into the housing 20 in which the second member 82 is received so as to be linearly displaceable along the guide recess 27. The guide recess 27 may be a linear guide recess. A longitudinal axis of the guide recess 27 may extend parallel to a rotation axis of the first member 81. To block rotation of the second member 82, a guide block 84 may be affixed to or may be integrally formed with the spindle. The guide block 84 may be guided along the guide recess 27 and prevents the second member 82 from rotating relative to the housing 30.

A drive mechanism configured to rotationally drive member 81 may be provided in the housing 30. The drive mechanism may include a power drive 26, which may be configured as a motor. The drive mechanism may include a gearing. The gearing may have one or several speed reduction stages. The gearing may comprise a one-stage worm transmission or a two stage worm transmission or another speed reduction gearing.

In operation of the actuator, actuation of the power drive 26 causes the first member 81 to be rotationally driven. The first member 81 performs a rotation about a rotation axis. This causes the second member 82 including the block 84 to be linearly displaced along the guide recess 27. The corresponding linear displacement 89 is also illustrated in FIG. 12.

The guide block 84 includes a channel 85 for allowing the inner member 13 of the first traction device 11 to pass through the guide block 84. An end of the sheath 14 of the first traction device 11 abuts on the guide block 84. The wire or cable 15 of the second traction device 12 is attached to the guide block 84 at its end 45. As explained with reference to FIG. 3 and FIG. 4, rotation of the first member 81 in a first direction of rotation causes the second member 82 of the spindle drive to be displaced in a translatory manner in a first direction. Rotation of the first member 81 in a second direction of rotation causes the second member 82 of the spindle drive to be displaced in a translatory manner in a second direction. This may simultaneously increase or decrease the tension applied by both the first traction device 11 and the second traction device 12.

The first traction device 11 and the second traction device 12 may be coupled to the second member 22, 82 of the spindle drive in various ways. As was explained in detail with reference to FIG. 2 to FIG. 12, the sheath of one traction device may be in abutting engagement with the second member 22, 82. This is, however, not required. For illustration, the inner members of two Bowden cables may be attached to the second member 22, 82 of the spindle drive, while the sheaths abut on the housing, as will be explained in more detail with reference to FIG. 13.

Figure 13:
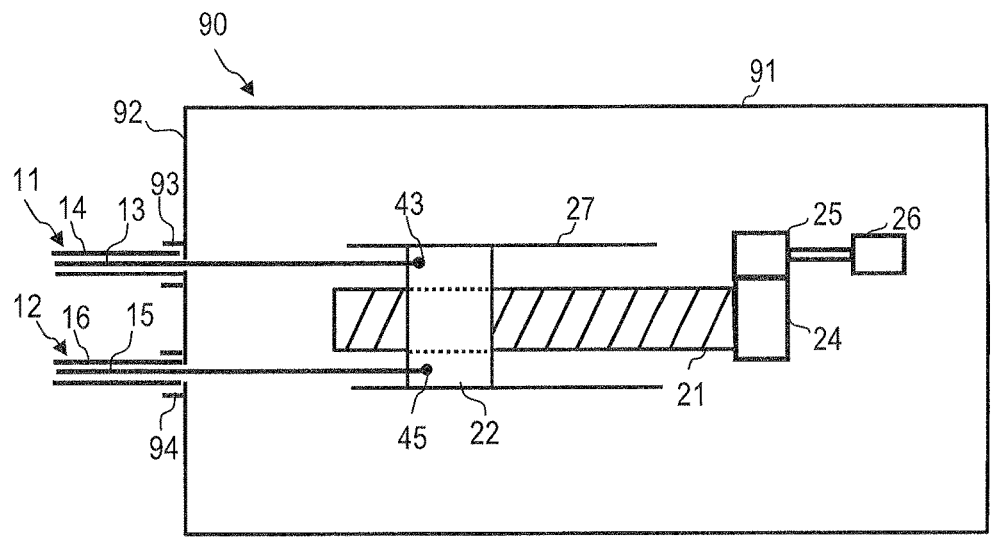
FIG. 13 is a schematic plan view of an actuator assembly according to another embodiment.

FIG. 13 shows an actuator assembly according to another embodiment. The actuator assembly comprises an actuator 90 which has a first member 21 which is rotatable and a second member 22 which is displaceable in a translatory manner and which is threadingly engaged with the first member 21.

Both an inner member 13 of the first traction device 11 and an inner member 15 of the second traction device 12 may be attached to the second member 22 of the spindle drive. Both an end of the sheath 14 of the first traction device 11 and an end of the sheath 16 of the second traction device 12 may be supported on receptacles 93, 94 formed at a housing 91 of the actuator 90. The inner member 13 of the first traction device 11 and the inner member 15 of the second traction device 12 may pass through the same side 92 of the housing 91. The first traction device 11 and the second traction device 12 may extend from the actuator 90 in the same direction.

Rotation of the first member 21 of the spindle drive causes the second member 22 to be linearly displaced along a rotation axis of the first member 21. Thereby, the tension applied by the first traction device 11 and the tension applied by the second traction device 12 may be simultaneously increased or may be simultaneously decreased, depending on the direction of rotation of the first member 21.

While the actuator assembly according to embodiments allows the tension applied by two traction devices to be simultaneously increased or to be simultaneously decreased, the actuator assembly may also be configured to increase the tension applied by a first traction device while simultaneously decreasing the tension applied by a second traction device. This will be explained in more detail with reference to FIG. 14.

Figure 14:
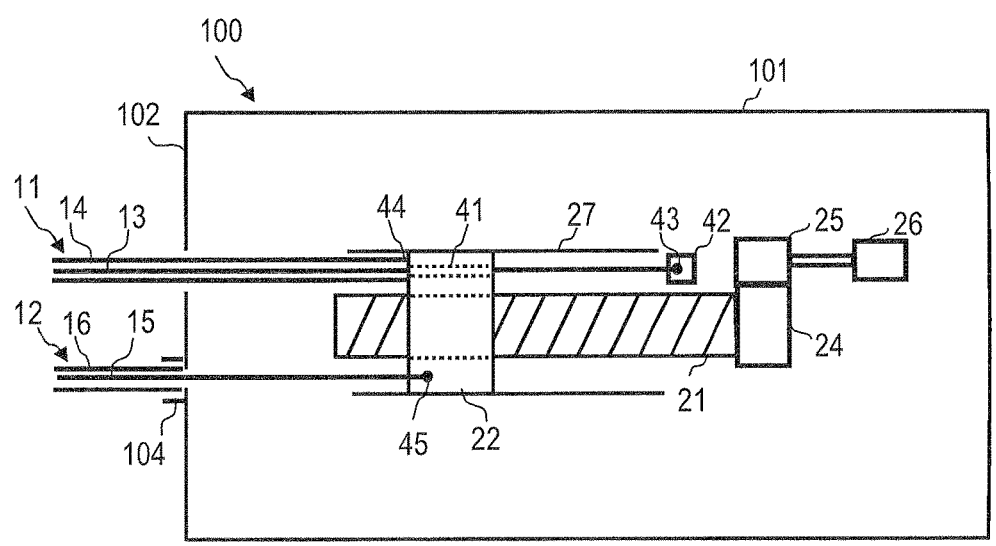
FIG. 14 is a schematic plan view of an actuator assembly according to another embodiment.

FIG. 14 shows an actuator assembly according to another embodiment. The actuator assembly comprises an actuator 100 which has a first member 21 which is rotatable and a second member 22 which is displaceable in a translatory manner and which is threadingly engaged with the first member 21.

A sheath 14 of the first traction device 11 and an inner member 15 of the second traction device 12 may be coupled to the second member 22 of the spindle drive. An end 43 of the inner member 13 of the first traction device 13 may be attached so as to be stationary relative to the housing 101 of the actuator 100. An end of a sheath 16 of the second traction device 12 may be supported on a receptacles 104 formed at the housing 101 of the actuator 100.

The inner member 13 of the first traction device 11 and the inner member 15 of the second traction device 12 may pass through the same side 102 of the housing 101. The first traction device 11 and the second traction device 12 may extend from the actuator 100 in the same direction.

Rotation of the first member 21 of the spindle drive causes the second member 22 to be linearly displaced along a rotation axis of the first member 21. The tension applied by the first traction device 11 may be increased and the tension applied by the second traction device 12 may be simultaneously decreased when the second member is displaced in a first direction, e.g. towards the side 102 of the housing 101. The tension applied by the first traction device 11 may be decreased and the tension applied by the second traction device 12 may be simultaneously increased when the second member is displaced in a first direction, e.g. away from the side 102 of the housing 101.

Actuators configured to simultaneously increase a tension applied by one traction device and decrease a tension applied by another traction device may be used in a wide variety of applications. Examples include shifting an apical position of a lumbar support or providing different degrees of side support when a vehicle travels through a curve, for example.

Figure 15:
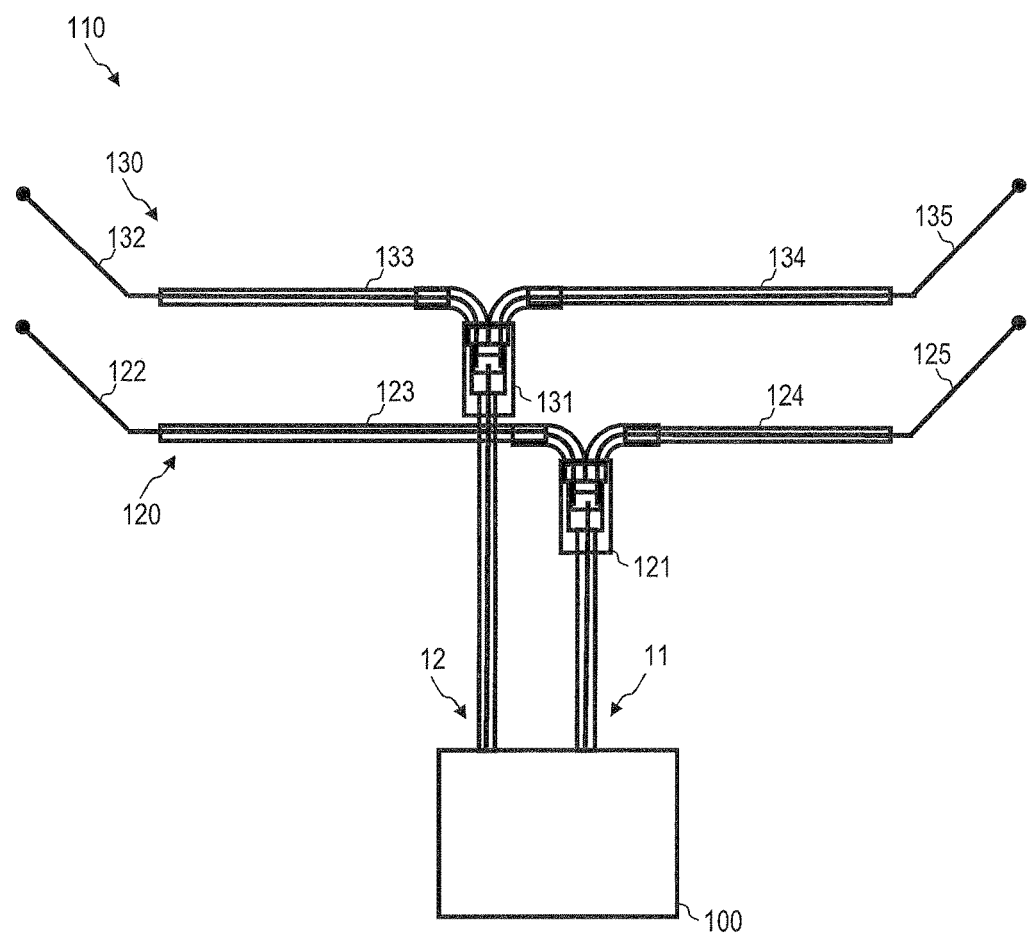
FIG. 15 shows the actuator assembly of FIG. 14 connected to a first adjustable portion and a second adjustable portion of a seat.

FIG. 15 is a partial view of a lumbar support adjusting mechanism 110 in which the actuator 100 may be used, for example.

The first traction device 11 may be coupled to a first pair of Bowden cables 120 via a first cable splitter 121. One Bowden cable of the first pair of Bowden cables 120 extends from the first cable splitter 121 towards a first side of a backrest and includes a sheath 123 and an inner member 122. Another Bowden cable of the first pair of Bowden cables 120 extends from the first cable splitter 121 towards a second side of a backrest and includes a sheath 124 and an inner member 125.

The second traction device 12 may be coupled to a second pair of Bowden cables 130 via a second cable splitter 131. One Bowden cable of the second pair of Bowden cables 130 extends from the second cable splitter 131 towards a first side of a backrest and includes a sheath 133 and an inner member 132. Another Bowden cable of the second pair of Bowden cables 130 extends from the second cable splitter 131 towards a second side of a backrest and includes a sheath 134 and an inner member 135.

When the actuator 100 is actuated such that the tension applied by the first traction device 11 is increased while the tension applied by the second traction device 12 is decreased, the first pair of Bowden cables 120 may increase a curvature of the lumbar support at a lower region of the lumbar support while the second pair of Bowden cables 130 may simultaneously decrease the curvature of the lumbar support at an upper region of the lumbar support. The apex may thereby be shifted downward.

Vice versa, when the actuator 100 is actuated such that the tension applied by the first traction device 11 is decreased while the tension applied by the second traction device 12 is increased, the first pair of Bowden cables 120 may decrease the curvature of the lumbar support at a lower region of the lumbar support while the second pair of Bowden cables 130 may simultaneously increase the curvature of the lumbar support at an upper region of the lumbar support. The apex may thereby be shifted upward.

The actuator according to any one of the embodiments may include a bias mechanism which is configured to at least partially compensate a variation in force exerted onto the second member 22, 82 of the spindle drive by the first traction device 11 and the second traction device 12. The force exerted onto the second member 22, 82 of the spindle drive by the first traction device 11 and the second traction device 12 will vary depending on the location of the second member 22, 82 along the rotation axis of the first member 21, 81 of the spindle drive. This variation may at least in part be compensated by the bias mechanism.

The bias mechanism may comprise at least one resilient member. The bias mechanism may comprise one spring or several springs coupled to the second member 22, 82. The spring(s) may be attached to the housing of the actuator in which the second member 22, 82 is displaceably mounted.

Figure 16:
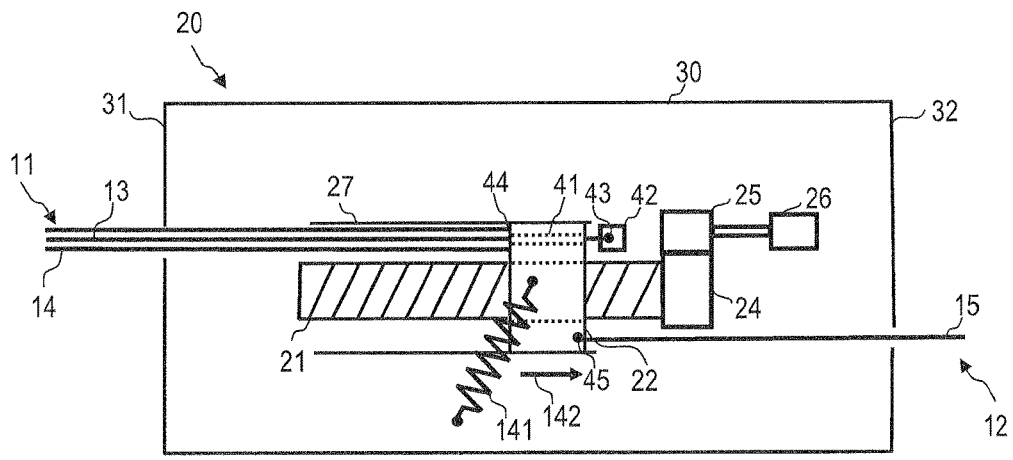
FIG. 16 is a schematic plan view of an actuator assembly according to another embodiment.
Figure 17:
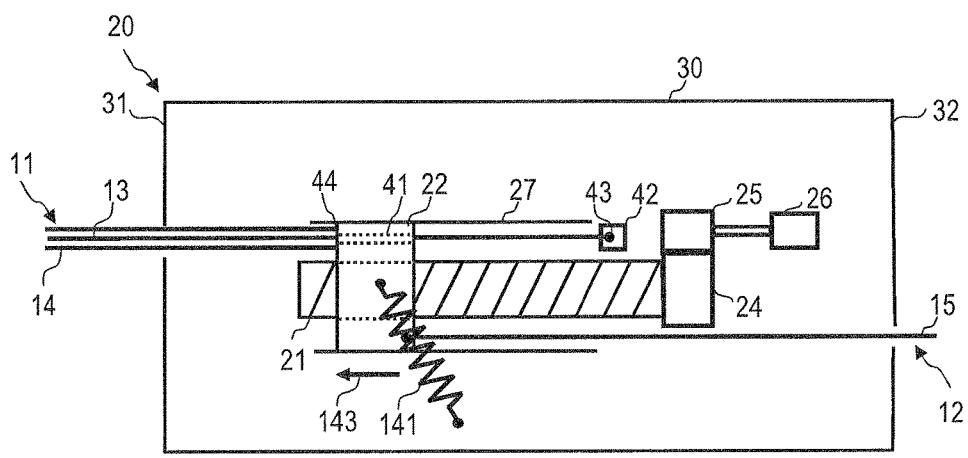
FIG. 17 is a schematic plan view of the actuator assembly of FIG. 16 in another operation state.

FIG. 16 and FIG. 17 show an actuator assembly according to an embodiment in which the actuator 20 comprises a bias mechanism 141. The bias mechanism comprises a spring attached to the second member 22 and the housing 30. The spring may be a compressive spring which applies a force onto the second member 22. The force may be a pushing force acting onto the second member 22. A force component 142, 143 of the force applied by the bias mechanism 141 and directed along the rotation axis of the first member 21 of the spindle drive has a magnitude which varies as a function of position of the second member 22. Not only the magnitude, but also the direction of the force component 142, 143 provided by the bias mechanism 141 along the movement direction of the second member 22 may vary, as illustrated in FIG. 16 and FIG. 17.

The bias mechanism 141 may be configured such that it decreases the variation between the maximum and minimum total forces exerted onto the second member 22 in a direction parallel to the rotation axis of the first member 21 of the spindle drive, as the second member 22 travels along the first member 21.

For illustration, when the second member 22 is positioned along its travel path at a position towards the second side 32 of the housing 30, the first traction device 11 and the second traction device 12 apply a first force onto the second member 22, the first force being directed towards the second side 32 and having a first magnitude. The bias mechanism 141 may exert a first bias force having a force component 142 along the movement direction onto the second member 22 of the spindle drive. The force component 142 may increase the total net force along the movement direction of the second member 22 when the second member 22 is in the position illustrated in FIG. 16, for example.

When the second member 22 is positioned along its travel path at a position towards the first side 31 of the housing 30, the first traction device 11 and the second traction device 12 apply a second force onto the second member 22, the second force being directed towards the second side 32 and having a second magnitude which is greater than the first magnitude. In this state, the bias mechanism 141 may exert a second bias force having a force component 143 along the movement direction onto the second member 22 of the spindle drive. The force component 143 may decrease the total net force along the movement direction of the second member 22 when the second member 22 is in the position illustrated in FIG. 17, for example.

The bias mechanism 141 is configured such that the force component along the movement direction of the second member 22 applied by the bias mechanism 141 varies in a manner which at least partially compensates the variation in the force exerted onto the second member 22 by the first traction device 11 and the second traction device 12. For illustration, if the force exerted onto the second member 22 by the first traction device 11 and the second traction device 12 increases monotonously as a function of position when the second member 22 is displaced along the first direction, the force component of the bias mechanism 141 acting along the movement direction may be a monotonously decreasing function of position. Vice versa, if the force exerted onto the second member 22 by the first traction device 11 and the second traction device 12 decreases monotonously as a function of position when the second member 22 is displaced along the first direction, the force component of the bias mechanism 141 acting along the movement direction may be a monotonously increasing function of position.

Figure 18:
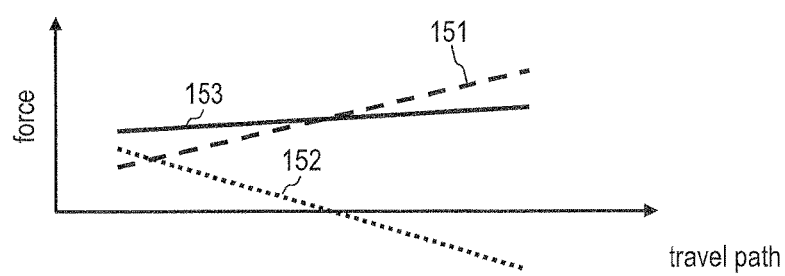
FIG. 18 is a diagram representing forces acting onto the second member of the spindle drive as a function of position of the second member.

FIG. 18 illustrates the operation of the bias mechanism 141 of an actuator according to an embodiment. FIG. 18 shows a force 151 exerted onto the second member 22, 82 of the spindle drive by the first traction device 11 and the second traction device 12. A force 152 directed parallel to the movement direction of the second member 22 is exerted onto the second member 22 by the bias mechanism 141. The net force 153 directed along the movement direction of the second member 22 is the sum of the force 151 and the force 152. The bias mechanism reduced the variation of the net force 153 acting onto the second member 22, 82 when the second member 22, 82 is displaced.

While embodiments have been described with reference to the drawings, modifications and alterations may be used in various other embodiments. For illustration, a bias mechanism operative as explained with reference to FIG. 16 to FIG. 18 may be included in the actuator assembly according to any embodiment. The bias mechanism may not only be implemented using a compressive spring, but may be implemented using various other resilient elements or combinations of resilient elements.

While embodiments have been described in which two traction devices are coupled to the second member of the spindle drive, the actuator assembly may comprise one or several further traction devices. For illustration, a third traction device may be coupled to the second member in addition to the first and second traction devices. More than three traction devices may be used.

It will be appreciated that various technical effects can be attained using the actuator assemblies and seats of embodiments. The actuator has a compact construction, which allows it to be integrated in a compact installation space. Several traction devices may be actuated simultaneously.

While exemplary embodiments have been described in the context of lumbar support adjustment, side support adjustment, and seat contour adjustment, embodiments of the invention are not limited to this particular field of application. Rather, embodiments of the invention may be advantageously employed to adjust a component in a wide variety of seats.

The invention claimed is:

1. An actuator assembly for adjusting at least one component of a seat, the actuator assembly comprising:
    a first traction device comprising a sheath and an inner member slidably arranged in the sheath;
    a second traction device comprising a cable or wire; and
    an actuator comprising a spindle drive, said spindle drive including
        a first member which is rotatably mounted, and
    a second member which is threadingly engaged with the first member and secured against rotation,
    wherein both the first traction device and the second traction device are coupled to the second member of the spindle drive,
    wherein the cable or wire of the second traction device is attached to the second member of the spindle drive, and
    wherein an end of the sheath of the first traction device abuts on the second member at a first side surface which is opposite to a second side surface of the second member to which the cable or wire of the second traction device is attached.

2. The actuator assembly of claim 1, wherein the second member of the spindle drive is displaceable along a rotation axis of the first member of the spindle drive in a translatory manner.

3. The actuator assembly of claim 1, wherein the actuator comprises a bias mechanism which exerts a bias force onto the second member of the spindle drive.

4. The actuator assembly of claim 1, wherein the first member is a spindle of the spindle drive and the second member is a spindle nut of the spindle drive, the spindle having an external thread and the spindle nut having an internal thread.

5. The actuator assembly of claim 1, wherein the first member is a spindle nut of the spindle drive and the second member is a spindle of the spindle drive, the spindle having an external thread and the spindle nut having an internal thread.

6. The actuator assembly of claim 1, further comprising a housing in which the spindle drive is housed, wherein the inner member is attached to the housing.

7. The actuator assembly of claim 6, wherein the second member of the spindle drive has a receptacle in which the end of the sheath is received in abutting engagement.

8. The actuator assembly of claim 6,
    wherein the housing has a first side and a second side arranged opposite to the first side, and
    wherein the first side defines a first passage through which the first traction device extends and the second side defines a second passage through which the second traction device extends.

9. The actuator assembly of claim 6, wherein the housing defines a linear guide recess in which the second member of the spindle drive is slidably supported.

10. A seat comprising:
    at least one adjustable portion; and
    the actuator assembly according to claim 1, wherein the first traction device and the second traction device are coupled to the at least one adjustable portion.

11. The seat according to claim 10, wherein the actuator assembly is configured to adjust at least one of a lumbar support of the seat, a contour of the seat, or a side support of the seat.

12. A method of adjusting at least one component of a seat coupled to the actuator assembly of claim 1, wherein the method comprises:
    actuating a motor to rotationally drive the first member of the spindle drive of the actuator assembly to cause a translatory displacement of the second member of the spindle drive.

* * * * *